United States Patent
Shouji

[19]
[11] Patent Number: 6,095,415
[45] Date of Patent: Aug. 1, 2000

[54] IGNITION SWITCH KEY CYLINDER

[75] Inventor: Osamu Shouji, Aichi-ken, Japan

[73] Assignee: Kabushiki Kaisha Tokai Rika Denki Seisakusho, Aichi-ken, Japan

[21] Appl. No.: 08/723,622

[22] Filed: Oct. 3, 1996

[30] Foreign Application Priority Data

Oct. 5, 1995 [JP] Japan ................................. 7-258840

[51] Int. Cl.⁷ .................................................. H04Q 1/00
[52] U.S. Cl. ...................... 235/449; 340/825.31; 340/426
[58] Field of Search ........................ 340/825.31, 825.34, 340/825.54, 425.5; 70/277, 278; 307/10.3; 235/439, 449

[56] References Cited

U.S. PATENT DOCUMENTS

| | | | |
|---|---|---|---|
| 4,918,955 | 4/1990 | Kimura | 70/277 |
| 5,023,605 | 6/1991 | McColl | 340/825.31 |
| 5,311,757 | 5/1994 | Spahn | 70/278 |
| 5,373,718 | 12/1994 | Schwerdt | 340/825.31 |
| 5,433,096 | 7/1995 | Janssen et al. | 70/278 |
| 5,461,386 | 10/1995 | Knebelkamp | 340/825.31 |
| 5,532,522 | 7/1996 | Dietz | 340/825.31 |
| 5,724,028 | 3/1998 | Prokup | 340/825.31 |

FOREIGN PATENT DOCUMENTS

| | | | |
|---|---|---|---|
| 0525730 A1 | 7/1992 | European Pat. Off. | E05B 47/06 |
| 0 559 159 A1 | 2/1993 | European Pat. Off. | E05B 49/00 |
| 0 628 684 A1 | 12/1994 | European Pat. Off. | E05B 49/00 |
| 39 21 893 A1 | 1/1990 | Germany | H04B 1/59 |
| 43 17 119 A1 | 11/1994 | Germany | B60R 25/04 |
| 6-263009 | 9/1994 | Japan | B60R 25/04 |

*Primary Examiner*—Brian Zimmerman
*Attorney, Agent, or Firm*—Limbach & Limbach, LLP

[57] ABSTRACT

A key identifying for an ignition switch key cylinder. The apparatus has a lock member that is unlocked by the key including a signal transmitter outputting an identifying signal. A computer determines an appropriate key for an unlocking use based on the identifying signal. The lock member includes a rotor being arranged to be rotated by the key, a case for accommodating the rotor, a cap secured to the case to detachably hold the rotor in the case and an antenna member receiving the identified signal from the transmitter and providing the determining means with information indicative of the identified signal, said antenna means being located in a position relatively constant with respect to the case.

8 Claims, 4 Drawing Sheets

IGNITION SWITCH KEY CYLINDER

BACKGROUND OF THE INVENTION

1. Field of the Invention

The present invention relates to an ignition switch key cylinder of a vehicle, and more particularly, to a key cylinder incorporating a coil serving as an antenna of a receiver.

2. Description of the Related Art

Some vehicles are equipped with anti-theft engine immobilizer systems. FIG. 7 shows an engine immobilizer system. A transponder 52 is incorporated in an ignition key 51 and transmits a signal indicative of an ID codes. A receiver is coupled to an engine start control computer incorporated in the vehicle. A coil antenna 55 is provided around a cap member 54, which is secured to a key cylinder 53. The receiver receives the ID code from the transponder 52 via the coil antenna 55. The receiver sends the received code to the computer. When the received ID code and an identification code stored therein do not match, the computer stops providing fuel to the engine. Therefore, the engine runs for a limited period of time when it is started by the ignition key 51. Therefore, a key having no transponder, if capable of starting the engine, cannot keep the engine running. Car theft is thus prevented.

The coil antenna 55 is constituted by a resin bobbin 56 and a coil 57. The coil 57 is wound around the bobbin 56. The bobbin 56 and the coil 57 are molded with resin. As shown in FIG. 8, a connector 58 and a tang 59 are formed integrally with the coil antenna 55. The coil antenna 55 is electrically coupled to the receiver via the connector 58.

As shown in FIG. 8, the key cylinder 53 is inserted in a substantially cylindrical lock body 60. The lock body 60 is incorporated in a steering handle lock (SHL). The key cylinder 53 is fixed in the lock body 60 by engaging a projection 61, which is provided on the cylinder 53 and biased outwardly by a spring, to a hole 62 formed in the lock body 60. The coil antenna 55 is fitted to the case 54 of the key cylinder 53. The antenna 55 is then secured to the lock body 60 by fastening a screw 63 to the body 60 through the tang 59. The coil antenna 55 and the key cylinder 53 are indirectly secured to each other by means of the screw 63 and the lock body 60.

The transponder 52 is a transmitter requiring no battery. When excited by the magnetic field generated by the coil 57 at a predetermined frequency, the transponder 52 is electrically charged. The transponder 52 then transmits an encrypted code using the charged electricity at a predetermined frequency. The frequency at which the transponder 52 is excited and the transmission frequency of the transponder 52 are previously determined. The characteristic values of the coil antenna 55, such as L (inductance) and Q values of the coil 57, play an important role when setting the resonance frequency of the receiver. The characteristic value of the antenna 55 varies depending upon the relative position of the coil 57 to a proximate metal object (the zinc die-cast case 54 in FIG. 5). In this case the characteristic values of the antenna 55 vary depending on the distance between the coil 57 and the case 54. A measuring and testing of the antenna characteristic value is performed with the coil antenna 55 temporarily mounted on the lock body 60. Only the coil antennas 55 having a characteristic value within a desirable range are shipped after the measuring and testing.

However, when assembling the coil antenna 55 to the lock body 60 on an assembly line, the position of the antenna 55 relative to the key cylinder 53, i.e., the distance between the antenna 55 and the cylinder 53, cannot be set exactly the same as the position in the measuring and testing. The antenna position also differs from one vehicle to another. Furthermore the relative position of the coil antenna 55 to the key cylinder 53 changes as the screw 63 is loosened by vibrations and heat cycles. These changes of the coil antenna position relative to the key cylinder 53 may result in the characteristic values of the coil antenna 55 being out of the desirable range.

Reducing the tolerance of parts dimension is a way to reduce the changes and variations of the distance between the coil antenna 55 and the key cylinder 53. This, however, results in a reduction of play between the parts and therefore makes the assembly difficult. Furthermore, a reduced parts tolerance, or enhanced accuracy of parts, increases the manufacturing cost.

SUMMARY OF THE INVENTION

Accordingly, it is an objective of the present invention to provide a key cylinder that prevents the changes and variations of the coil antennas characteristic values.

To achieve the above objective, a key identifying apparatus is disclosed. The apparatus has a lock member that is unlocked by the key including a signal transmitter outputting an identifying signal. A computer determines an appropriate key for an unlocking use based on the identifying signal. The lock member includes (a)a rotor being arranged to be rotated by the key, (b) a case for accommodating the rotor, (c) a cap secured to the case to detachably hold the rotor in the case and (d) antenna member receiving the identified signal from the transmitter and providing the determining means with information indicative of the identified signal, said antenna means being located in a position relatively constant with respect to the case.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of the present invention will now be described.

Figure 1:
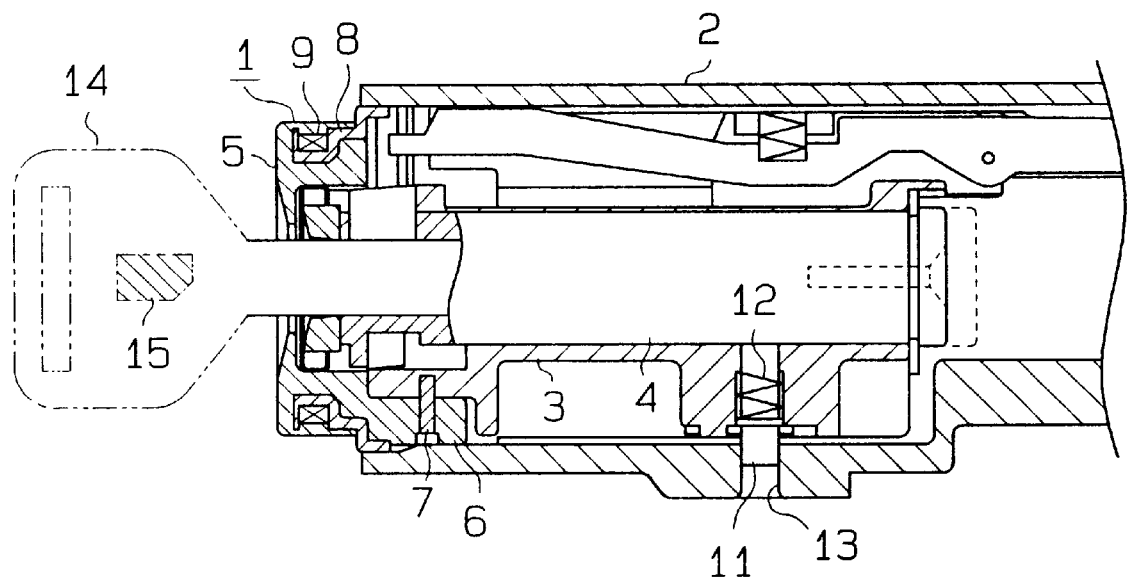
FIG. 1 is a partial sectional view illustrating a key cylinder according to an embodiment of the present invention.

A key cylinder 1 shown in FIG. 1 is provided in front of the driver's seat (not shown). The key cylinder 1 is accommodated in a substantially cylindrical lock body 2. The lock body 2 is incorporated in a steering handle lock (SHL), which locks the rotation of a steering wheel (not shown).

The key cylinder 1 includes a case 3. The case 3 is made of metal (e.g. zinc die-cast) and has a substantially cylindrical shape. A metal rotor 4 is rotatably accommodated in the case 3. The rotor 4 has a known structure, in which a plurality of tumblers (not shown) are provided.

A cap 5 is secured to the case 3. A tang 6 is integrally formed with the cap 5. A grooved pin 7 is inserted in the case 3 through the tang 6 of the cap 5. The tang 6 is secured to the case 3 by the pin 7. Accordingly, the cap 5 retains the rotor 4 in the rotor case 3.

The cap 5 is made of resin and has a substantially annular shape. A bobbin 8 is integrally secured to the cap 5. The bobbin 8 is also made of resin and has annular shape. A coil 9 is wound around the bobbin 8. The characteristic values, such as inductance (L) value, of the coil 9 are set to resonate to the frequency of signals transmitted from a transponder 15, which will be described later.

The cap 5 is substantially the same size as the combination of a cap and a coil antenna of the conventional key cylinder. That is, the cap 5 not only retains the rotor 4, but also serves as a coil antenna of the prior art.

The cap 5 is a second molded product formed by an insert molding. The bobbin 8 having the coil 9 wound therearound is the primary product of the insert molding. Since the grooved pin 7 is not loosened by vibrations or heat cycles, the position of the coil 9 in the cap 5 stays unchanged relative to the metal case 3. The characteristic values of the coil 9 therefore stay unchanged over time. Since the cap 5 is made of resin, the distance between the coil 9 and the nearest metal object, the rotor 4 and the case 3 in this embodiment, are longer than the distance between a conventional coil and a cap. The characteristic values of the coil 9 are less influenced by the rotor 4 and the rotor case 3, as compared to the conventional art.

Figure 2:
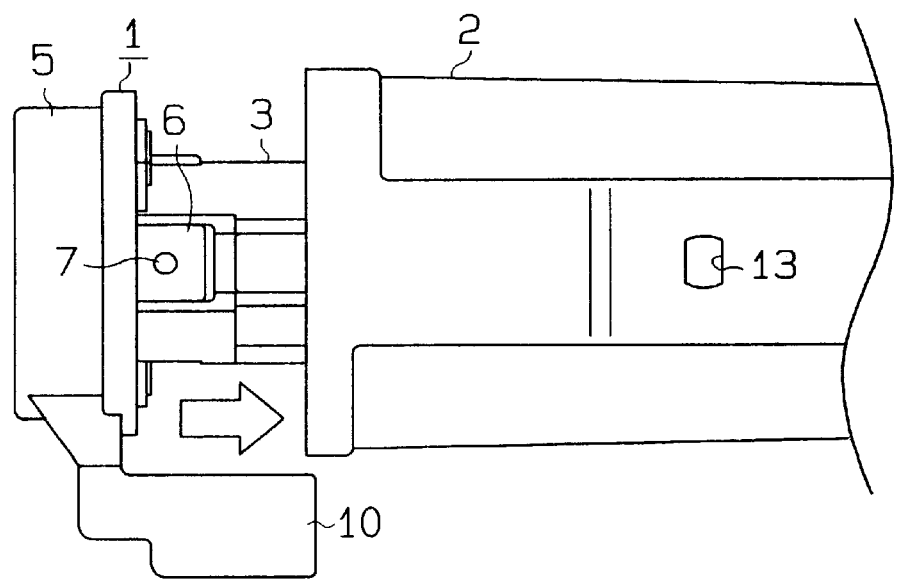
FIG. 2 is a partial side view for illustrating the assembly of a key cylinder.

As shown in FIG. 2, a connector 10 is integrally formed with the cap 5. The coil 9 in the cap 5 is electrically coupled to a receiver (not shown) through the connector 10. A lock pin 11 is provided in the rotor case 3. The lock pin 11 is biased outwardly by a spring 12. When the rotor case 3 is inserted in the lock body 2, the spring 12 urges the lock pin 11 so that the pin 11 engages a lock hole 13 formed in the lock body 2. The key cylinder 1 is thus secured in the lock body 2. The cap 5, which incorporates a coil 9 serving as an antenna, is integrally secured to the key cylinder 1. Therefore, in the assembly process, the cap 5 is secured to the body 2 simply by inserting the key cylinder 1 into the body 2.

As shown in FIG. 1, an ignition key 14 is inserted in the rotor 4. The rotor 4 is rotated by the ignition key 14. The rotation of the rotor 4 switches connections between a plurality of contacts and starts various operations, such as starting the engine.

Figure 5:
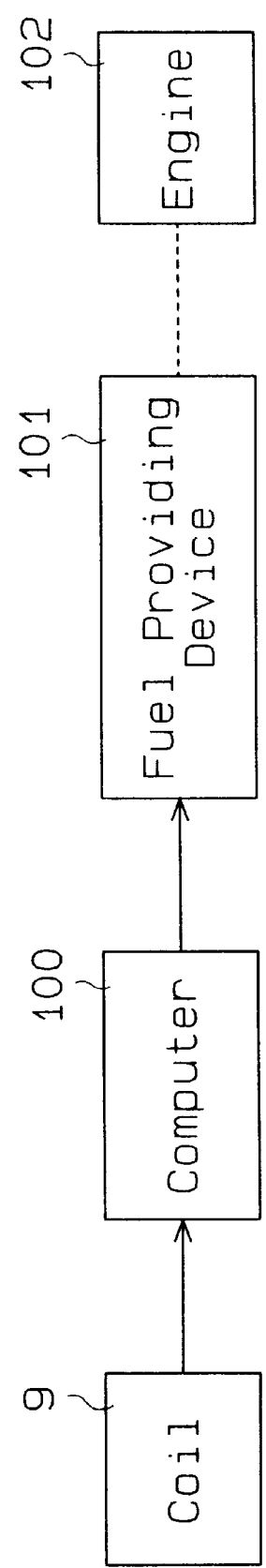
FIG. 5 is a block diagram illustrating an engine immobilizer system.

A transponder 15 is incorporated in the ignition key 14. The transponder 15 transmits a signal at a predetermined frequency when the ignition key 14 is inserted in the key cylinder 1. A computer 100 incorporated in an engine immobilizer system detects the insertion of the ignition key 14 into the key cylinder 1 and then sends a predetermined current to the coil 9 to generate a magnetic field. The magnetic field charges the transponder 15 with electrical energy. Using the charged energy, the transponder 15 transmits the signal containing an ID code. As shown in FIG. 5, the computer 100 receives the signal of the transponder 15 from the coil 9. The computer 100 then compares the ID code contained in the received signal and a previously stored identification code. When the two codes match, the computer 100 keeps a started engine 102 running by activating a fuel providing device 101. When the two codes do not match, the computer 100 stops the engine by deactivating the fuel providing device 101. Theft of the car is thus prevented.

The above described embodiment of the present invention has the following advantages.

In the above embodiment, the coil 9, which serves as an antenna, is incorporated in the resin cap 5 by double molding. The cap 5 is then secured to the case 3 of the key cylinder 1. This prevents the position of the coil 9 from changing relative to nearby metal objects (rotor 4 and the case 3). The characteristic values of the antenna stay unchanged. That is, the antenna has the same characteristic values when it is tested and when it is actually mounted on a vehicle.

Since the metal case of the conventional key cylinder is omitted, the space between the coil 9 and the nearest metal objects, such as the rotor 4 and the case 3, is wider. The characteristic values of the coil 9 are less influenced by the metal objects than with the conventional key cylinder. This facilitates determining the number of turns of the coil 9 and the diameter of the bobbin 8.

The cap 5, which serves as a coil antenna, is secured to the rotor case 3 in the key cylinder 1. This requires less accuracy of the parts compared to the conventional key cylinder, in which the coil antenna 55 is secured to the key cylinder 53 by means of the lock body 60. The manufacturing cost of the key cylinder is thus reduced.

In the above embodiment, the cap 5, which serves as a coil antenna, and the rotor case 3 are secured to each other by the grooved pin 7. Therefore, the assembly is completed simply by inserting the key cylinder 1 into the lock body 2. This process is fairly simple compared to the assembly of the conventional key cylinder, which requires insertion of the key cylinder into the lock body 60 prior to the attachment of the coil antenna 55 to the lock body 60 by means of the screw 63. The number of the assembly steps is reduced accordingly. Furthermore, omitting the screw 63 reduces the manufacturing cost.

Since it is secured only to the rotor case 3, the cap 5, which serves as a coil antenna, has no tang to be secured to the lock body 2. The same cap 5 can be used for different lock bodies 2 having different shapes depending on the type of the vehicle. This facilitates size reduction and standardization of the key cylinder 1.

Figure 3:
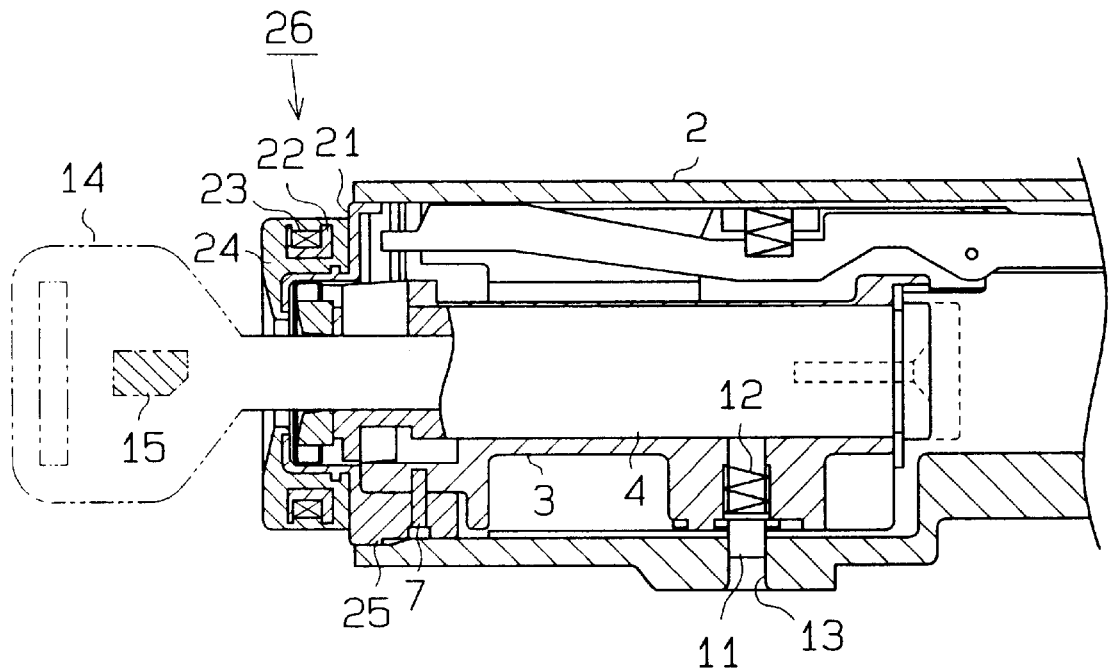
FIG. 3 is a partial sectional view illustrating another key cylinder embodiment.

A second embodiment of the present invention will be described with reference to FIG. 3. A key cylinder 26 includes, as primary products, a metal cap 21 for retaining the rotor 4, a bobbin 22 and a coil 23. A coil antenna 24 is formed through an insert molding of the primary products. Then a tang 25 of the cap 21 is secured to the case 3 by the grooved pin 7. The distance between the coil 23 and the metal cap 21 is smaller than in the first embodiment. However, since cap 21 and the coil antenna 24 are integrally molded, the position of the coil 23 relative to the case 21 stay unchanged over time. The characteristic values of the coil antenna 24 stays unchanged, accordingly.

Figure 4:
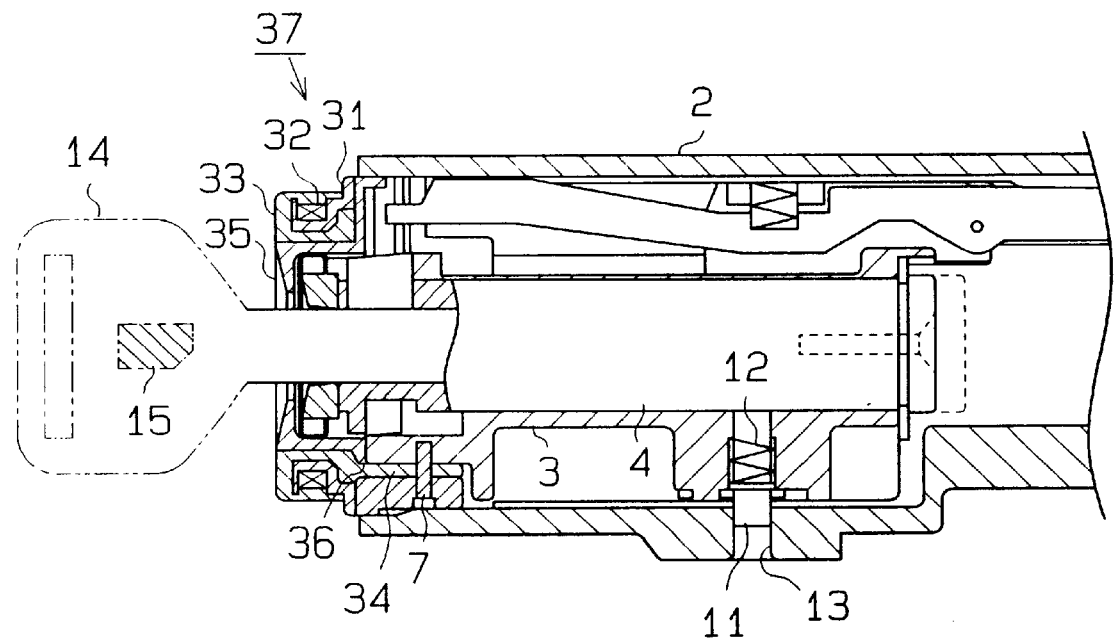
FIG. 4 is a partial sectional view illustrating another key cylinder embodiment.

Next, a third embodiment of the present invention will be described with reference to FIG. 4. In this embodiment, a coil antenna 33 is formed through an insert molding of a bobbin 31 and a coil 32. The coil antenna 33 has a tang 34 protruding therefrom. A metal cap 35 has a through hole 36.

The tang 34 is inserted into the hole 36 and the grooved pin 7 is inserted in the case 3 penetrating the tang 34. Accordingly, the tang 34 is secured to the case 3. In other words, a key cylinder 37 is formed by integrating the coil antenna 33 and the case 35. In this embodiment, the distance between the coil 32 and the cap 35 is smaller than in the first embodiment. However, since the coil antenna 33 and the cap 35 are directly secured to the case 3, the position of the coil 32 relative to the cap 35 stays unchanged over time. The characteristic values of the coil antenna 33 stay unchanged, accordingly.

In the above embodiments, the key cylinders 1, 26 and 37 incorporating the coils 9, 23 and 32 are utilized for engine immobilizer system. However, the present invention may be embodied in key cylinders having a coil antenna in other systems.

Figure 6:
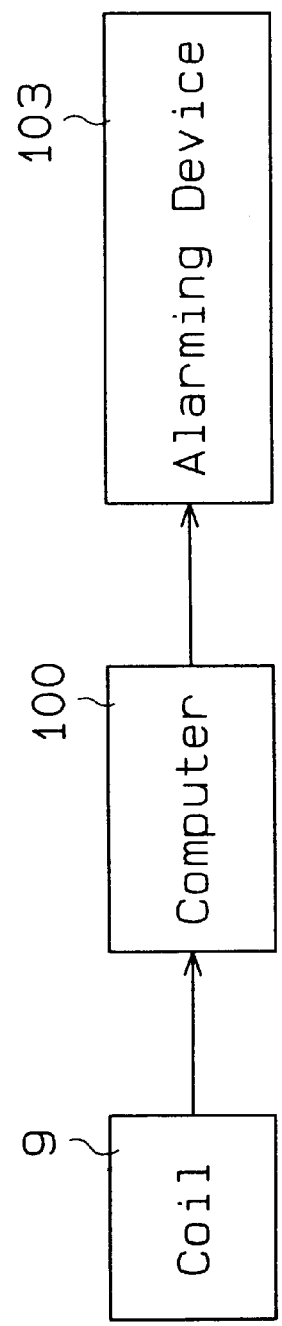
FIG. 6 is a block diagram illustrating an alarming system.
Figure 7:
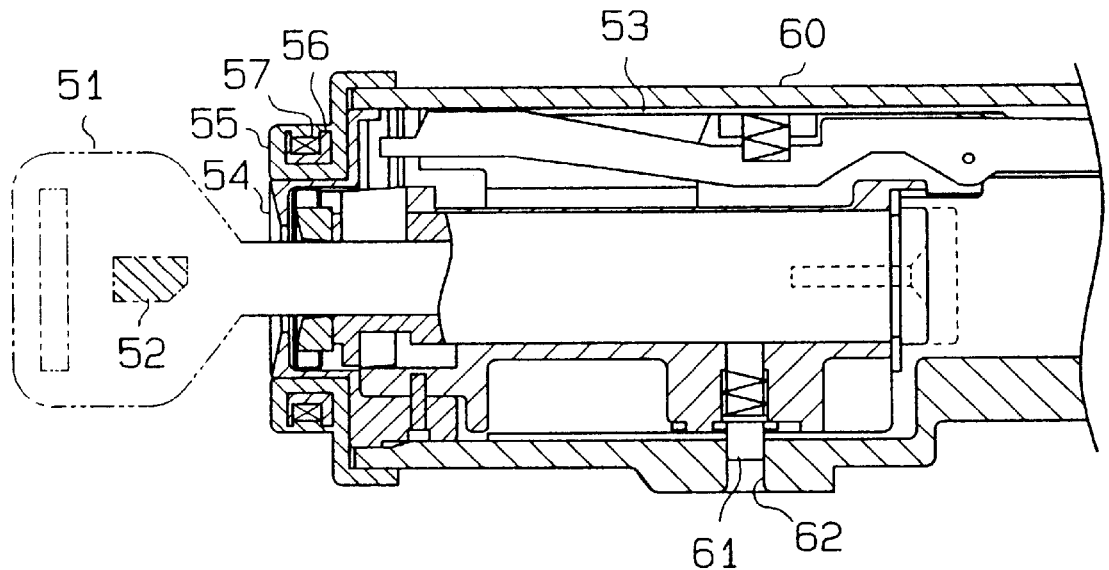
FIG. 7 is a partial sectional view illustrating a conventional key cylinder.
Figure 8:
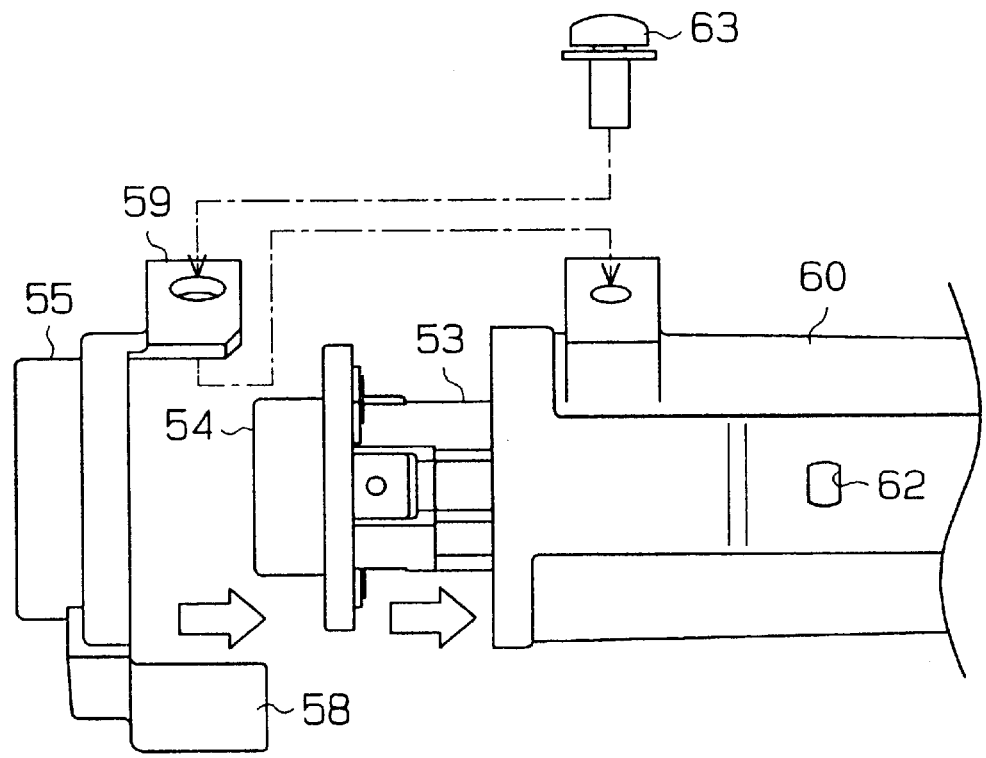
FIG. 8 is a partial side view for illustrating the assembly of a conventional coil antenna and a key cylinder.

In the above embodiments, the key cylinders 1, 26 and 37 are embodied as a key cylinder for starting the engine of a vehicle. However, the present invention may be utilized for doors of a vehicle. Further, the present invention may be utilized in an alarming system for house doors or the door of a safe. In this case, the system preferably has an alarming device 103 as shown in FIG. 6. The computer activates the alarming device 103 when the ID code of a key and the identification code stored in the computer do not match.

Therefore, the present examples and embodiments are to be considered as illustrative and not restrictive, and the invention is not to be limited to the details giving herein, but may be modified within the scope of the appended claims.

What is claimed is:

1. A key identifying apparatus having a lock member that is unlocked by a key including a signal transmitter outputting an identifying signal, wherein determining means determines an appropriate key for an unlocking use based on the identifying signal, said apparatus comprising:

said lock member including
(a) a rotor being arranged to be rotated by the key;
(b) a case for accommodating the rotor;
(c) a cap secured to the case to detachably hold the rotor in the case; and
(d) antenna means for receiving the identifying signal from the transmitter and providing the determining means with information indicative of the identifying signal, said antenna means being located in a position relatively constant with respect to the case, wherein said antenna means includes a bobbin made of a synthetic resin material and a coil wound on the bobbin, and wherein said bobbin having the coil wound thereon is molded in the cap.

2. The apparatus as set forth in claim 1, wherein said rotor and said case are both made of a metallic material.

3. The apparatus as set forth in claim 2, wherein said cap is made of a synthetic resin material.

4. The apparatus as set forth in claim 2, wherein said cap is made of a metallic material.

5. An ignition key identifying system having a lock member that is unlocked by an ignition key including a transponder outputting a frequency signal, wherein determining means determines an appropriate key for an unlocking use based on the frequency signal, said system comprising:

said lock member including
(a) a metallic rotor being arranged to be rotated by the ignition key;
(b) a metallic case for accommodating the rotor;
(c) a cap secured to the case to detachably hold the rotor in the case; and
(d) antenna means for receiving the frequency signal from the transponder and providing the determining means with information indicative of the frequency signal, said antenna means being located in a position relatively constant with respect to the case, wherein said antenna means includes a bobbin made of a synthetic resin material and a coil wound on the bobbin, and wherein said bobbin having the coil wound thereon is molded in the cap.

6. The system as set forth in claim 5, wherein said cap is made of a synthetic resin material.

7. The system as set forth in claim 5, wherein said cap is made of a metallic material.

8. The system as set forth in claim 5 further comprising:

an engine actuated by the rotor that is rotated by the ignition key;
a member for supplying fuel to the engine;
said determining means including a computer storing an identifying frequency; and
said computer being arranged to instruct the fuel supplying member to further supply the fuel to the engine when the frequency of the signal and identfying signal are identical to each other.

* * * * *